United States Patent Office 3,371,988
Patented Mar. 5, 1968

3,371,988
METHOD OF BENEFICIATING CLAY BY
REMOVAL OF TITANIUM IMPURITIES
Robert N. Maynard and Bobby Ray Skipper, Cochran, and Nathan Millman, Macon, Ga., assignors to J. M. Huber Corporation, a corporation of New Jersey
No Drawing. Continuation-in-part of application Ser. No. 625,022, Mar. 22, 1967. This application Aug. 25, 1967, Ser. No. 663,221
10 Claims. (Cl. 23—110)

ABSTRACT OF THE DISCLOSURE

This disclosure covers a method of beneficiating kaolin clay by removing titanium impurities from a clay slurry. The process produces clays with a higher brightness than is possible with conventional treatment of the same clay.

*Cross reference to related applications*

This application is a continuation-in-part of our copending application Ser. No. 625,022, filed Mar. 22, 1967, now abandoned, which application in turn is a continuation-in-part of our prior applications Ser. Nos. 428,852 and 428,857 filed on Jan. 28, 1965, now abandoned.

*Background of the invention*

(1) FIELD OF THE INVENTION

This invention is concerned with a method for improving the brightness of clays. More particularly, this invention is concerned with a method for improving the brightness of kaolin clays in which a large percentage of titanium impurities are removed as by normal gravity settling or centrifugation, from a clay slurry.

(2) DESCRIPTION OF THE PRIOR ART

Natural occurring clays vary considerably in their color properties, even when produced from mines in the same locality or even from different sites in the same mine. Natural occurring kaolin clay deposits contain discoloring contaminants, for example iron and titanium minerals. Titanium minerals in kaolin usually occur as discolored particles and these are largely responsible for the yellow-brown shade of many kaolins. Often a clay is rejected as being unsuitable for commercial use solely on the basis of color even through its other physical properties such as the viscosity of clay-water slurries and particle size distribution are within desired limits.

The brightness of clays usually is increased by fractionation, the finer the particle size the brighter the clays; however, this increase is insufficient for the more discolored clays in order to be acceptable commercially and additional treatment is required of the refined clays such as chemical bleaching. Bleaching with chemicals such as zinc or sodium hydrosulphite generally results in improved brightness of the refined clay slurries, but this is usually an increase of only 2 to 5 brightness points. There are other methods of improving the brightness of clays but generally they are quite expensive and do not give a sufficient increase in brightness to justify the expense.

*Summary of the invention*

Generally, the invention is practiced by subjecting a slurry of kaolin clay to an overdose of peptizing agent beyond that which is necessary to achieve minimum viscosity and thus causing the titanium impurities to settle.

More specifically, clays from mines are generally crushed and then slurried in order to produce a clay slip. These slips or slurries are then classified to the desired clay fraction by such methods as hydroseparation, centrifugal forces, etc. These are well known methods in the prior art. Prior to this classification, the clay slurries are treated with a peptizing agent in order to achieve minimum viscosity, or a maximum dispersion of clay particles to facilitate fractionation. These peptizing agents are well known in the clay field and among those which may be used are polyphosphates, carbonates, silicates, alkalies in general, mixtures thereof, basic salts, etc. The amounts of these agents used in the original deflocculation of the clay slurries may vary from 0.5 pounds per ton of dry clay to 8 pounds per ton of dry clay, the exact amount depending on the clay system itself and the type of peptizing agent used.

We define minimum viscosity as a property of each clay-water-dispersant system which is measured at 60% solids with a Brookfield viscometer at 10 r.p.m. (No. 1 spindle). The dispersant dose needed to effect minimum viscosity at 60% solids for each system is considered the same regardless of the solids at which the slurries are subsequently used in the process of this invention.

The conventional methods of classification of clay slurries normaly increase the clay brightness by about 0.5 to about 3.5 points above that of the original clay. These refined clays are then generally bleached with known chemical bleaching agents identified hereinbefore which normally increase the brightness of these classified clays from about 2 to about 5 points. These clays are then generally filtered and dried, which places the refined clays in a condition for commercial use. Thus with the normal refining procedure of the clay industry, one is able to prepare clays for commercial use having a brightness of not more than around 88 points.

Generally, the process of this invention will improve the brightness of the clays from about 2 about 5 points above the conventionally classified and bleached clays. The process of this invention surpasses the normal refining methods of the clay industry producing, in many cases, clays with a brightness of above 90.

It is known in the kaolin industry, as previously stated, that a peptizing agent is used to attain minimum viscosity or maximum dispersion of clay particles in a slurry in order to facilitate fractionation of kaolin to the desired particle distribution. Under these conditions it is possible to improve brightness of kaolin by preparation of fine fractions of higher surface area. However, the mere step of preparing fine fractions does not necessarily reduce the content of discoloring contaminants, particularly titanium minerals. The use of dispersants under these conditions produces a state known as deflocculation. It is also well known that an excess of peptizing agent can result in an undesirable increase in viscosity because of the formation of a reflocculated state. In fact, if the peptizing treatment is carried too far an intractable gel state can occur. For these reasons the present practices scrupulously avoid a reflocculated state but carefully maintain a condition of minimum viscosity during classification.

We have now discovered that, contrary to the practice of the prior art, the reflocculated state has unique utility because it creates a system for the controlled release of titanium contaminants. Indeed, we have found that fractionations in the reflocculated state can achieve a preferential separation of titanium impurities, resulting in a significant increase in purity and brightness of the refined kaolin fraction.

In the practice of our invention, we add an excess of peptizing agent, beyond the amount normally required to classify the clay and deliberately create a reflocculated slurry. In this condition, separation and sedimentation of titanium impurities occur. It is generally preferred to use a dose of peptizing agent which is twice or more of that required to produce minimum viscosity. Obviously, an amount of dispersing agent sufficient to cause a gel state should be avoided.

Once the condition of a reflocculated clay slurry has been attained, the titanium impurities appear to be liberated from the clay particles. This is manifested initially in an overall darkening of the original slurry followed by the formation of yellow-brown or tan colored, vertical streaks which extend over the length of the column. These streaks will sometimes appear almost as soon as the overdose is added but, in any case, will appear within a relatively short settling interval. These eventually settle to the bottom of the container where a badly discolored sediment becomes evident. The settling is, therefore, continued until the disappearance of the streaks, after which the refined suspension is siphoned off. It is not of importance the time during which this specially treated clay slurry is allowed to stand as other methods beside natural gravity may be used to separate or settle these titanium impurities and also fractionate the clay slurry, for example centrifuging, etc.

The process of the invention can be practiced on bleached or unbleached crude clays or fractions thereof. In the case of bleached clays, the soluble salts resulting from bleaching must be substantially removed prior to the practice of the invention. In the case where bleaching is to follow the practice of the invention it is preferable to wash the soluble salts from the clay before proceeding with conventional bleaching.

Description of the preferred embodiments

The invention will be more fully understood by the following examples which are illustrative and not limiting. All percentages are by weight unless otherwise indicated.

Example 1

As a control for the next three examples showing the effect of varying slurry solids, a sample of unbleached slurry, containing 25.0 percent clay solids, was obtained from normal plant production. This clay was previously refined from crude by dispersing with 4 pounds of Calgon, sodium hexametaphosphate, per ton of dry clay to minimum viscosity and classifying to a fraction composed of about 92.0 percent, by weight, finer than 2 micron diameter particles, E.S.D., (Equivalent Spherical Diameter). The clay of this slurry had a brightness of 82.9. Conventional bleaching with 8 pounds of zinc hydrosulfite and 6 pounds of alum per ton of dry clay gave a brightness of 88.2.

Example 2

The starting slurry of Example 1, containing 25.0 percent clay solids, was treated by mixing in a Waring Blendor for 30 minutes with an additional amount of dispersant, sodium hexametaphosphate, amounting to 20 pounds per ton of dry clay. The treated slurry was thus excessively peptized to a point of reflocculation and allowed to stand without agitation in an 11.4 inch slurry height column, the container being composed of a transparent plastic material. Within a period of ½ to 1 hour, the slurry became visibly discolored with an evenly distributed tan coloration when compared with the untreated slurry from the plant, (Example 1). Highly discolored streaks or striations with visibly lighter color areas between the streaks extended from top to bottom in the slurry column. After about 22 hours, the vertical discolored streaks disappeared and the yellow sludge deposit become constant in depth. The clay slurry was then drawn off leaving the deposit in the bottom of the column.

The recovered clay slurry was acidified with 0.985 pounds of sulfuric acid per ton of dry clay and 14.9 pounds of alum per ton of dry clay to create a fluocculated slurry and permit filtration to substantially remove the excess chemicals. The filtered material showed a brightness of 84.4. The filtered clay was reslurried with water to about 30 percent solids and bleached with 8 pounds of zinc hydrosulfiite per ton of dry clay and 2 pounds of alum per ton of dry clay. After bleaching, this clay had a brightness of 90.4, or an increase in brightness of 2.2 over the control.

Example 3

Example 2 was repeated except the starting slurry was diluted in clay solids content to 20.0 percent with water prior to chemical treatment. Also, the additional amount of dispersant consisted of 25 pounds of sodium hexametaphosphate per ton of dry clay instead of the additional amount of 20 pounds per ton of dry clay used in Example 2. The diluted slurry required more dispersant to produce the desired condition of reflocculation than the 25 percent clay solids slurry.

This specially treated clay had a brightness of 84.0 before bleaching and a brightness of 89.8 after bleaching, or 1.6 improvement over the control.

Example 4

Example 2 was repeated except the starting slurry was increased in clay solids content to 40.0 percent, prior to chemical treatment, by adding filter cake prepared by flocculating and filtering a portion of the original slurry. Also, the additional amount of dispersant consisted of 10 pounds of sodium hexametaphosphate per ton of dry clay instead of the additional amount of 20 pounds per ton of dry clay used in Example 2. The higher concentrated clay solids slurry, containing 40 percent solids, required less dispersant to produce the desired degree of reflocculation than the 25 percent clay solids slurry.

This specially treated clay had a brightness of 84.4 before bleaching and a brightness of 89.8 after bleaching, or 1.6 points higher than control.

TABLE I.—EFFECT OF TREATING AND SETTLING AT VARYING CLAY SOLIDS

| Condition | Slurry Solids, Percent | Refined Clay Brightness | |
|---|---|---|---|
| | | Unbleached | Bleached |
| Control, Example 1 | 25 | 82.9 | 88.2 |
| Treated Clay, Example 2 | 20 | 84.0 | 89.8 |
| Treated Clay, Example 3 | 25 | 84.4 | 90.4 |
| Treated Clay, Example 4 | 40 | 84.4 | 89.8 |

Example 5

As a control for the next example, showing the effect of using a whole crude as the starting material, a sample of crude clay composed of about 55 percent, by weight, finer than 2 micron diameter particles, E.S.D. and having a brightness of 80.2 was obtained from a mine located in central Georgia. This crude was pugged in an enclosed laboratory model Read Kneader. The pugging was performed at about 74 percent clay solids for 20 minutes without the addition of dispersant. After pugging, the crude clay was slurried at about 40 percent clay solids and dispersed with 4 pounds of sodium hexametaphosphate per ton of dry clay, an amount normally used to obtain minimum viscosity. The dispersed slurry was degritted through a 325 mesh screen to remove sand, mica, quartz, etc. This screened slurry was refined by settling in a 11.4 inch slurry height column for 10.5 hours to recover a fraction composed of 92.7 percent, by weight, finer than 2 micron diameter particles, E.S.D. The clay of this slurry had a brightness of 83.1. Conventional bleaching with 10 pounds of zinc hydrosulfite per ton of dry clay and 6 pounds of alum per ton of dry clay gave a brightness of 87.7.

Example 6

The starting crude of Example 5 was treated by pugging with a dispersant, sodium hexametaphosphate, amounting to 15 pounds per ton of dry clay. This specially treated clay, after pugging, was slurried, degritted and settled in a 11.4 inch slurry height column for 19 hours. During sedimentation, tan vertical streaks formed and settled in the time required for the clay to classify to a fraction composed of 92 percent, by weight finer than 2 micron diameter particles, E.S.D. The clay slurry was recovered and washed substantially free of excess chemical by the method described in Example 2. This specially treated clay had a brightness of 84.9 before bleaching and a brightness of 89.8 after bleaching, or 2.1 points higher than the control.

*Example 7*

As a control for the next example, a slurry was obtained from production after kneading, slurrying, dispersing with 3 to 4 pounds of sodium hexametaphosphate per ton of dry clay and degritting. This degritted slurry, containing 31.6 percent clay solids, was composed of 66 percent, by weight, finer than 2 micron diameter particles, The starting clay of this example when conventionally bleached gave a brightness of 87.5.

*Example 10*

A sample of unbleached slurry, containing 29.22 percent clay solids, was obtained from normal plant production of a No. 1 coating grade fraction. This clay was previously refined as described in Example 9. The clay of this slurry had a brightness of 83.3. This slurry was treated identically to the method described in Example 9. This specially treated clay had a brightness of 86.0 before bleaching and a brightness of 90.6 after bleaching, or 3.1 points higher than the control.

The starting clay of this example when conventionally bleached gave a brightness of 87.5.

TABLE II.—EFFECT OF TREATING AND SETTLING VARYING TYPE STARTING CLAYS

| Type Clay | P.S. Percent Finer Than 2 Microns | Dispersant, Lbs./Ton clay | Finished Clay Brightness | | P.S. Percent Finer Than 2 Microns |
|---|---|---|---|---|---|
| | | | Unbleached | Bleached | |
| Crude, control Example 5 | 55 | 4 lbs. Calgon | 83.1 | 87.7 | 92.7 |
| Treated crude, Example 6 | 55 | 15 lbs. Calgon | 84.9 | 89.8 | 92.0 |
| Degritted, control Example 7 | 66 | 4 lbs. Calgon | 82.8 | 88.1 | 91.0 |
| Treated degritted, Example 8 | 66 | 20 lbs. Calgon | | 90.2 | 91.0 |
| Refined, control Example 9 | 92 | 4 lbs. Calgon | 83.7 | 87.5 | 92.0 |
| Treated refined, Example 9 | 92 | 20 lbs. Calgon | 86.4 | 90.8 | 94.0 |
| Refined, control Example 10 | 92 | 4 lbs. Calgon | 83.3 | 87.5 | 92.0 |
| Treated refined, Example 10 | 92 | 20 lbs. Calgon | 86.0 | 90.6 | 93.6 |

E.S.D. The slurry was classified by sedimentation to recover a fraction composed of 91 percent, by weight, finer than 2 micron diameter particles, E.S.D.

The clay of this slurry had a brightness of 82.8. After bleaching with 10 pounds of zinc hydrosulfite per ton of dry clay and 7 pounds of alum per ton of dry clay, the clay brightness was increased to 88.1.

*Example 8*

The starting degritted slurry of Example 7, composed of 66 percent, by weight, finer than 2 micron diameter particles, E.S.D., was treated by mixing in a Waring Blendor for 15 minutes with an additional amount of dispersant, sodium hexametaphosphate, amounting to 20 pounds per ton of dry clay. This slurry was transferred to a transparent container and allowed to settle, without agitation, at a slurry height column of 11.4 inches. The formation of a discolored state followed by typical vertical streaks were noted as described in the previous Example 6. These streaks disappeared after a period of approximately 24 hours. The withdrawn, cleansed clay was composed of 91 percent, by weight, finer than 2 micron diameter particles, E.S.D.

This specially treated clay had a brightness of 90.2 after bleaching, or 2.1 points higher than the control.

*Example 9*

A sample of unbleached slurry, containing 28.33 percent clay solids, was obtained from normal plant production of a No. 1 coating grade fraction. This clay was previously refined from crude by dispersing with 4 pounds of sodium hexametaphosphate to minimum viscosity and classifying to recover a fraction composed of about 92 percent, by weight, finer than 2 micron diameter particles, E.S.D. The clay of this slurry had a brightness of 83.7. This slurry was treated by mixing in a Cowles dissolver for 30 minutes with an additional amount of dispersant, sodium hexametaphosphate, amounting to 20 pounds per ton of dry clay. The treated slurry was allowed to stand without agitation in a 56 inch slurry height column for a period of 72 hours. After sedimentation, the clay suspension was withdrawn from the off-colored deposit and washed substantially free of excess chemicals by the method described in Example 2. This specially treated clay had a brightness of 86.4 before bleaching and a brightness of 90.8 after bleaching, or 2.3 points higher than the control.

*Example 11*

A sample of unbleached slurry containing approximately 31 percent clay solids was obtained from normal plant production of a No. 1 coating grade fraction. This clay was previously refined as described in Example 9. The clay of this slurry had a brightness of 85.0. This slurry was treated by mixing in a Cowles dissolver for 30 minutes with an additional amount of dispersant, a combination of sodium hexametaphosphate, amounting to 15 pounds per ton of dry clay, and sodium carbonate, amounting to 5 pounds per ton of dry clay. The treated slurry was allowed to stand without agitation in a 56 inch slurry height column for an approximate period of 70 hours. After sedimentation, the clay slurry was recovered and washed substantially free of excess chemicals by the method described in Example 2. This specially treated clay had a brightness of 87.6 before bleaching and a brightness of 90.6 after bleaching, or 2.6 points higher than the control.

The starting clay of this example when conventionally bleached gave a brightness of 88.0.

*Example 12*

Example 11 was repeated except the starting slurry was obtained on a different production date. The clay of this slurry had a brightness of 81.8. This slurry was treated identically to Example 11.

This specially treated clay had a brightness of 84.4 before bleaching and a brightness of 90.5 after bleaching, or 3.5 points higher than the control.

The starting clay of this example when conventionally bleached gave a brightness of 87.0.

*Example 13*

Examples 11 and 12 were repeated except that the starting clay had a brightness of 80.8.

The specially treated clay in this case had a brightness of 84.6 before bleaching and a brightness of 90.8 after bleaching, or 4 points higher than the control.

The starting clay of this example when conventionally bleached gave a brightness of 86.8.

TABLE III.—EFFECT OF TREATING CLASY HAVING VARYING INITIAL BRIGHTNESS

| Condition | Starting Clay Brightness | Finished Clay Brightness | |
|---|---|---|---|
| | | Unbleached | Bleached |
| Control | 85.0 | | 88.0 |
| Treated Clay, Example 11 | | 87.6 | 90.6 |
| Control | 81.8 | | 87.0 |
| Treated Clay, Example 12 | | 84.4 | 90.5 |
| Control | 80.8 | | 86.8 |
| Treated Clay, Example 13 | | 84.6 | 90.8 |

Example 14

A sample of unbleached slurry containing 29.22 percent clay solids, was obtained from normal plant production. This example is intended to show the effect of this process on the titanium impurities. This clay was previously refined as described in Example 9. The clay of this slurry had a brightness of 83.3 and contained 1.73 percent, by weight, of titanium impurities expressed as $TiO_2$. This slurry was treated by mixing in a Cowles dissolver for 30 minutes with an additional amount of dispersant, a combination of sodium hexametaphosphate, amounting to 20 pounds per ton of dry clay, and sodium hydroxide, amounting to 0.39 pound per ton of dry clay. The treated slurry was allowed to stand without agitation in a 56 inch slurry height column for 72 hours. After settling of discolored impurities, the clay suspension was withdrawn and washed substantially free of excess chemicals by the method described in Example 2. This specially treated clay, before bleaching, had a brightness of 86.0 and contained 0.91 percent, by weight, of titanium impurities expressed as $TiO_2$. After bleaching this clay had a brightness of 91.0 or 3.5 points higher than the control.

The starting clay of this example when conventionally bleached had a brightness of 87.5.

Example 15

A sample of unbleached slurry, containing 31.3 percent clay solids, was obtained from normal plant production. This example also shows the effect of this process on the titanium impurities. This clay was previously refined as described in Example 9. The clay of this slurry had a brightness of 83.4 and contained 1.58 percent, by weight, of titanium impurities expressed as $TiO_2$. This slurry was treated by mixing in a Cowles dissolver for 30 minutes with an additional amount of dispersant, sodium hexametaphosphate, amounting to 20 pounds per ton of dry clay. The treated slurry was allowed to stand, without agitation, in a 55¾ inch slurry height column for 72 hours. After settling of discolored impurities the clay suspension was withdrawn and washed substantially free of excess chemicals by the method described in Example 2. This specially treated clay, before bleaching, had a brightness of 85.9 and contained 0.92 percent, by weight, of titanium impurities expressed as $TiO_2$. After bleaching, this clay had a brightness of 90.8, or 2.6 points higher than the control. The starting slurry of this example when conventionally bleached gave a brightness of 88.2.

Example 16

As a control for the next three examples showing the effect of treating with various type dispersants, a sample of unbleached slurry, containing 28.33 percent clay solids, was obtained from normal plant production. This clay was previously refined as described in Example 9. The clay of this slurry had a brightness of 84.4. Conventional bleaching with 8 pounds of zinc hydrosulfite per ton of dry clay and 6 pounds of alum per ton of dry clay gave a brightness of 88.2.

Example 17

The starting slurry of Example 16 was treated by mixing in a Waring Blendor for 15 minutes with an additional amount of dispersant, Sodium Silicate, D Brand, 14.7 percent $Na_2O$ and 29.4 percent $SiO_2$, amounting to 20 pounds per ton of dry clay. The treated slurry was allowed to stand without agitation in an 11.4 inch slurry height column for 24 hours. After settling of discolored impurities, the clay suspension was withdrawn and washed substantially free of excess chemicals by the method described in Example 2. This specially treated clay had a brightness of 85.4 before bleaching and a brightness of 90.6 after bleaching, or 2.4 points higher than the control.

Example 18

Example 17 was repeated except treatment of the starting slurry was accomplished with an additional amount of dispersant, sodium hexametaphosphate, amounting to 20 pounds per ton of dry clay, instead of the sodium silicate, D Brand, used in Example 17.

This specially treated clay had a brightness of 85.8 before bleaching and a brightness of 89.8 after bleaching, or 1.6 points higher than the control.

Example 19

Example 17 was repeated except treatment of the starting slurry was accomplished with an additional amount of dispersant, Dequest 2006, an organic polyphosphate, amounting to 20 pounds per ton of dry clay, instead of the sodium silicate, D Brand, used in Example 17. This specially treated clay had a brightness of 89.3 after bleaching, or 1.1 points higher than the control.

TABLE V.—EFFECT OF TREATING WITH VARIOUS TYPE DISPERSANTS

| Condition | Additional Dispersant | | Clay Brightness | |
|---|---|---|---|---|
| | Identity | Lbs./Ton Clay | Unbleached | Bleached |
| Control, Example 16 | | | 84.4 | 88.2 |
| Treated Clay, Example 17 | Sodium Silicate, D Brand | 20 | 85.4 | 90.6 |
| Treated Clay, Example 18 | Sodium Hexametaphosphate | 20 | 85.8 | 89.8 |
| Treated Clay, Example 19 | Organic Polyphosphate, Dequest 2006 | 20 | | 89.3 |

Example 20

As a control for the next two examples showing the effect of treating with combinations of dispersants, a sample of unbleached slurry, containing 26.22 percent clay solids, was obtained from normal plant production. This clay was previously refined from crude obtained from east Georgia deposits by dispersing with 6 pounds of sodium hexametaphosphate per ton of dry clay to minimum viscosity and classifying to a fraction composed of about 94 percent, by weight, finer than 2 micron diameter particles, E.S.D. The clay of this slurry had a brightness of 83.0. Conventional bleaching with 10 pounds of

TABLE IV.—REDUCTION IN CONTENT OF TITANIUM IMPURITIES

| Condition | Starting Clay | | Finished Clay | | |
|---|---|---|---|---|---|
| | $TiO_2$ Content, Percent | Brightness | $TiO_2$ Content, Percent | Brightness | |
| | | | | Unbleached | Bleached |
| Control | 1.73 | 83.3 | 1.73 | | 87.5 |
| Treated Clay, Example 14 | | | 0.91 | 86.0 | 91.0 |
| Control | 1.58 | 83.4 | 1.58 | | 88.2 |
| Treated Clay, Example 15 | | | 0.92 | 85.9 | 90.8 | zinc hydrosulfite per ton of clay and 6 pounds of alum per ton of clay gave a brightness of 86.2.

Example 21

The starting slurry of Example 20 was treated by mixing in a laboratory model Kady Mill for 20 minutes with an additional amount of dispersant, sodium hexametaphosphate, amounting to 25 pounds per ton of clay.

The treated slurry was allowed to stand without agitation in an 11.4 inch slurry height column for about 22 hours. After settling of discolored impurities the clay suspension was withdrawn and washed substantially free of excess chemicals by the method described in Example 2. This specially treated clay had a brightness of 88.7 after bleaching, or 2.5 points higher than the control.

Example 22

Example 21 was repeated except treatment of the starting slurry was accomplished with an additional amount of dispersant, a combination of sodium hexametaphosphate, amounting to 20 pounds per ton of dry clay, and sodium hydroxide, amounting to 5 pounds per ton of dry clay, instead of the single dispersant, sodium hexametaphosphate used in Example 21. This specially treated clay had a brightness of 90.5 after bleaching, or 4.3 points higher than the control.

TABLE VI.—EFFECT OF TREATING WITH COMBINATION OF DISPERSANTS

| Condition | Additional Dispersant | | Clay Brightness | |
|---|---|---|---|---|
| | Identity | Lbs./Ton Clay | Unbleached | Bleached |
| Control, Example 20 | | | 83.0 | 86.2 |
| Treated Clay Single Dispersant, Example 21. | Sodium Hexametaphosphate | 25 | | 88.7 |
| Treated Clay Dispersant Combination, Example 22. | {Sodium Hexametaphosphate | 20 | | |
| | Sodium hydroxide | 5 | | 90.5 |

Example 23

As a control for the next three examples showing the effect of settling a treated slurry in various slurry height columns, a sample of unbleached slurry, containing 30.22 percent clay solids, was obtained from normal plant production. This clay was previously refined as described in Example 9. The clay of this slurry had a brightness of 82.0. Conventional bleaching with 10 pounds of zinc hydrosulfite per ton of clay and 6 pounds of alum per ton of dry clay gave a brightness of 87.0.

Example 24

The starting slurry of Example 23 was treated by mixing with a Cowles Dissolver for 30 minutes with an additional amount of dispersant, a combination of sodium hexametaphosphate, amounting to 15 pounds per ton of dry clay, and sodium carbonate, amounting to 5 pounds per ton of dry clay. The treated slurry was allowed to stand without agitation in a 12 inch slurry height column for approximately 16 hours. After settling of discolored impurities the clay suspension was withdrawn and washed substantially free of excess chemicals by the method described in Example 2. This specially treated clay had a brightness of 84.7 before bleaching and a brightness of 89.4 after bleaching, or 2.4 points higher than the control.

Example 25

Example 24 was repeated except the slurry, after being treated with the additional amount of dispersants, was allowed to stand without agitation in a 36 inch slurry height column for a period of approximately 40 hours. This specially treated clay had a brightness of 84.5 before bleaching and a brightness of 89.5 after bleaching, or 2.5 points higher than the control.

Example 26

Example 24 was repeated except the slurry, after being treated with the additional amount of dispersants, was allowed to stand without agitation in a 58 inch slurry height column for a period of approximately 71 hours. This specially treated clay had a brightness of 84.7 before bleaching and a brightness of 89.5 after bleaching, or 2.5 points higher than the control.

TABLE VII.—EFFECT OF SETTLING TREATED CLAY IN VARYING COLUMN HEIGHT

| Condition | Slurry Height Column, inches | Sedimentation | | Clay Brightness | |
|---|---|---|---|---|---|
| | | Time, hours | Rate, hrs./inch | Unbleached | Bleached |
| Control, Example 23 | | | | 82.0 | 87.0 |
| Treated Clay, Example 24 | 12 | 16 | 1.33 | 84.7 | 89.4 |
| Treated Clay, Example 25 | 36 | 40 | 1.11 | 84.5 | 89.5 |
| Treated Clay, Example 26 | 58 | 71 | 1.22 | 84.7 | 89.5 |

Example 27

As a control for the next three examples showing the effect of treating a slurry with varying additional amounts of dispersants, a sample of unbleached slurry, containing 25 percent clay solids, was obtained from normal plant production. This clay was previously refined as described in Example 9. The clay of this slurry had a brightness of 82.9. After conventionally bleaching with 8 pounds of zinc hydrosulfite per ton of dry clay and 6 pounds of alum per ton of dry clay this clay had a brightness of 88.2.

Example 28

The starting slurry of Example 27 was treated by mixing in a Waring Blendor for 30 minutes with an additional amount of dispersant, sodium hexametaphosphate, amounting to 15 pounds per ton of dry clay. The treated slurry was allowed to stand without agitation in a 11.4 inch slurry height column for approximately 24 hours. After settling discolored impurities, the clay suspension was withdrawn and washed substantially free of excess chemicals by the method described in Example 2. This specially treated clay had a brightness of 84.1 before bleaching and a brightness of 89.4 after bleaching, or 1.2 points higher than the control.

Example 29

Example 28 was repeated except the starting slurry was treated with an additional amount of dispersant, sodium hexametaphosphate, amounting to 20 pounds per ton of dry clay instead of the 15 pounds per ton of dry clay used in Example 28.

This specially treated clay had a brightness of 84.4 before bleaching and a brightness of 90.4 after bleaching, or 2.2 points higher than the control.

Example 30

Example 28 was repeated except the starting slurry was treated with an additional amount of dispersant, sodium hexametaphosphate, amounting to 25 pounds per ton of dry clay instead of the 15 pounds per ton of dry clay used in Example 28.

This specially treated clay had a brightness of 83.6 before bleaching and a brightness of 88.8 after bleaching, or 0.6 points higher than the control.

TABLE VIII.—EFFECT OF TREATING WITH VARYING AMOUNTS OF DISPERSANTS

| Condition | Additional Dispersant, Lbs./Ton Clay | Clay Brightness | |
|---|---|---|---|
| | | Unbleached | Bleached |
| Control, Example 27 | | 82.9 | 88.2 |
| Treated Clay, Example 28 | 15 | 84.1 | 89.4 |
| Treated Clay, Example 29 | 20 | 84.4 | 90.4 |
| Treated Clay, Example 30 | 25 | 83.6 | 88.8 |

Example 31

As a control for the next example showing the effect of initially dispersing the crude with a dispersant other than sodium hexametaphosphate used in the previous examples, a sample of crude clay having a brightness of 83.3 was obtained from production after kneading. The kneaded crude was slurried at 46.33 percent solids and initially dispersed to minimum viscosity with 4 pounds of B–W brand sodium silicate, containing a ratio of 19.5 percent $Na_2O$ to 31.2 percent $SiO_2$, per ton of dry clay. The dispersed slurry was degritted through a 325 mesh screen to remove sand, mica, quartz, etc. This screened slurry was refined by settling in a 11.4 inch slurry height column for 23 hours to recover a fraction composed of about 92 percent, by weight, finer than 2 micron diameter particles, E.S.D. The clay of this slurry had a brightness of 85.7. Conventional bleaching with 8 pounds of zinc hydrosulfite per ton of dry clay and 6 pounds of alum per ton of dry clay gave a brightness of 87.9.

Example 32

The starting degritted slurry from Example 31, initially dispersed with sodium silicate, was treated by mixing in a Waring Blendor for 30 minutes with an additional amount of dispersant, B–W brand sodium silicate, amounting to 20 pounds per ton of dry clay. This slurry was transferred to a transparent container and allowed to settle, without agitation, at a slurry height column of 11.4 inches. The formation of a discolored state followed by typical vertical streaks were noted as described in Example 6. These streaks disappeared after a period of 20 hours time required for the clay to classify to a fraction composed of about 92 percent, by weight, finer than 2 micron diameter particles, E.S.D. After sedimentation, the clay suspension was withdrawn from the off-colored deposit and washed substantially free of excess chemicals by the method described in Example 2. This specially treated clay had a brightness of 86.4 before bleaching and a brightness of 89.3 after bleaching, or an increase of 1.4 points higher than the control.

is obvious from the above examples that numerous peptizing agents as well as mixtures thereof may be used in the method of this invention and the clay concentration in the slurry can be varied over a considerable range. Further, it is noted that different peptizing agents may be used in the initial fractionation to the point where the process of the invention begins. The same peptizing or dispersing agent used initially may also be used in this reflocculation process or a different agent may be used than that initially used in the fractionation. When the starting material is a crude clay or, for that matter, a clay of considerable coarseness, sedimentation of the coarser particles and separation of titanium impurities occur simultaneously. When the starting material represents a fine extraction from the crude, reflocculation of the slurry produces suspensional stability to the clay particles but at the same time allows separation and settling of the titanium flocs by virtue of their higher density.

As should be appreciated, the step of actually separating the titanium impurities from the specially conditioned system which serves to liberate them may be accomplished as desired. Thus a batch type process or a continuous process may employ normal gravity settling technique. For example, a continuous decantation system is readily adapted to normal gravity separation. Similarly, multiple gravity effects may be employed instead, as by centrifuge or cyclonic separators. Basically, the choice depends upon economics.

As regards separation by centrifuge, the following examples are provided as being of aid to the art in establishing a suitable gravity multiple in relation to particular clays and dilution conditions.

CENTRIFUGATION OF REFLOCCULATED SLURRIES

An International Centrifuge, Size 1, Type SB, manufactured by the International Equipment Company, Boston, Mass., was used in all of the following examples showing the effect of centrifugation of reflocculated clay slurries. The centrifuge was equipped with a horizontal, 4-place pin-type head and slotted trunnions that accommodated 250 milliliter capacity bottles.

Example 33

As a control for the next 4 examples showing the effect of using a whole crude as the starting material, a sample of crude clay, having a brightness of 78.9, was obtained from a mine located in central Georgia. This crude was slurried at about 40 percent clay solids and dispersed with 4 pounds of sodium hexametaphosphate per ton of dry clay, an amount normally used to obtain minimum viscosity.

A conventional type of fine fraction was separated from the dispersed crude. This slurry was composed of clay having a brightness of 79.9. Conventional bleaching with 12 pounds of zinc hydrosulfite per ton of dry clay and 6 pounds of alum per ton of dry clay gave a brightness of 86.7.

Example 34

The starting crude of Example 33 was treated by slurry-

TABLE IX.—EFFECT OF INITIAL DISPERSANT (B-W SILICATE)

| Condition | Initial Dispersant | Reflocculating Dispersant | Finished Clay Brightness | |
|---|---|---|---|---|
| | | | Unbleached | Bleached |
| Control, Example 31 | B–W Brand Sodium Silicate | | 85.7 | 87.9 |
| Treated Clay, Example 32 | do | B–W Brand Sodium Silicate | 86.4 | 89.3 |

Thus it is seen from the foregoing examples that the process of this invention is quite unique in that it generally raises the brightness of the clays to about 89 percent or above. This is a very substantial improvement over that obtained with conventional methods. In addition, it ing with a dispersant, a combination of sodium hexametaphosphate, amounting to 25 pounds per ton of dry clay, and sodium carbonate, amounting to 5 pounds per ton of dry clay. A portion of this treated slurry, containing 60 percent clay solids, by weight, was subjected to a centrifugal force of 709.2 times gravity for a period of 10 minutes.

After centrifugation, the sedimented material was visibly darker, with a yellow brown coloration, when compared with the deposit obtained in the untreated control (Example 33). The clay suspension was withdrawn leaving a deposit in the bottom of the centrifuge bottle.

The recovered clay was diluted to about 30 percent solids and washed substantially free of excess chemicals. This was accomplished by acidifying the slurry with 0.87 pound of sulfuric acid per ton of dry clay and 13.77 pounds of alum per ton of dry clay to create a flocculated slurry which was filtered. The filtered material was diluted with water and reslurried to about 30 percent solids and bleached with 12 pounds of zinc hydrosulfite per ton of dry clay. After bleaching this clay had a brightness of 89.1 or an increase in brightness of 2.4 points over the control.

*Example 35*

Example 34 was repeated except the treated slurry was diluted with water to 50 percent clay solids before centrifuging.

This specially refined clay had a brightness of 90.0 after bleaching, or 4.2 points higher than the control.

*Example 36*

Example 34 was repeated except the treated slurry was diluted to 50 percent solids and subjected to a centrifugal force of 101 times gravity for a period of 15 minutes.

This specially refined clay had a brightness of 89.1 after bleaching, or 2.4 points higher than the control.

*Example 37*

Example 34 was repeated except the treated slurry was diluted to 45 percent solids and subjected to a centrifugal force of 101 times gravity for a period of 15 minutes.

This specially refined clay had a brightness of 91.5 after bleaching, or 4.8 points higher than the control.

*Example 38*

As a control for the next 5 examples also showing the effect of using a whole crude as the starting material, a sample of crude clay, having a brightness of 81.8, was obtained from east Georgia deposits. This crude was slurried at about 35 percent clay solids and dispersed with 5 pounds of sodium hexametaphosphate per ton of dry clay, an amount normally used to obtain minimum viscosity.

A conventional type of fine fraction was separated from the dispersed crude. This slurry was composed of clay having a brightness of 83.9. Conventional bleaching with 10 pounds of zinc hydrosulfite per ton of dry clay and 6 pounds of alum per ton of dry clay gave a brightness of 87.8.

*Example 39*

The starting crude of Example 38 was treated by slurrying with a dispersant, a combination of sodium hexametaphosphate, amounting to 6 pounds per ton of dry clay, and sodium meta-silicate, amounting to 20 pounds per ton of dry clay. A portion of this treated slurry, containing 65 percent clay solids, was subjected to a centrifugal force of 1099.8 times gravity for a period of 30 minutes.

After centrifugation, the clay suspension was withdrawn from the discolored deposit and washed substantially free of excess chemicals by the method described in Example 34. After bleaching, this specially treated clay had a brightness of 90.3, or 2.5 points higher than the control.

*Example 40*

Example 39 was repeated except the treated slurry was diluted to 50 percent clay solids and subjected to a centrifugal force of 1099.8 times gravity for a period of 10 minutes. This specially refined clay had a brightness of 93.1 after bleaching, or 5.3 points higher than the control.

*Example 41*

Example 39 was repeated except the treated slurry was diluted to 40 percent clay solids and subjected to a centrifugal force of 1099.8 times gravity for a period of 5 minutes.

This specially refined clay had a brightness of 91.9 after bleaching, or 3.3 points higher than the control.

*Example 42*

Example 39 was repeated except the treated slurry was diluted to 40 percent clay solids and subjected to a centrifugal force of 350.3 times gravity for a period of 15 minutes.

After bleaching, this specially refined clay had a brightness of 92.8, or 5.0 points higher than the control.

*Example 43*

Example 39 was repeated except the treated slurry was diluted to 50 percent clay solids and subjected to a centrifugal force of 101 times gravity for a period of 30 minutes.

After bleaching, this specially refined clay had a brightness of 90.5, or 2.7 points higher than the control.

*Example 44*

Example 39 was repeated except the treated slurry was diluted to 45 percent clay solids and subjected to a centrifugal force of 101 times gravity for a period of 15 minutes.

After bleaching, this specially refined clay had a brightness of 90.6, or 2.8 points higher than the control.

*Example 45*

Example 39 was repeated except the treated slurry was reduced to 25 percent clay solids and subjected to a centrifugal force of 101 times gravity for a period of 5 minutes.

This specially refined clay had a brightness of 90.4 after bleaching, or 2.6 points higher than the control.

TABLE X.—EFFECT OF TREATING AND CENTRIGUFING WHOLE CRUDE CLAYS

| Type Clay | Starting Clay Brightness | Slurry Solids, percent | Centrifugation | | Finished Clay Brightness | |
|---|---|---|---|---|---|---|
| | | | Force Times Gravity | Time, Minutes | Unbleached | Bleached |
| Central Georgia Crude, Control, Example 33 | 78.9 | | | | 79.9 | 86.7 |
| Treated Clay, Example 34 | | 60 | 709.2 | 10 | | 89.1 |
| Treated Clay, Example 35 | | 50 | 709.2 | 10 | | 90.9 |
| Treated Clay, Example 36 | | 50 | 101.0 | 15 | | 89.1 |
| Treated Clay, Example 37 | | 45 | 101.0 | 15 | | 91.5 |
| East Georgia Crude, Control, Example 38 | 81.8 | | | | 83.9 | 87.8 |
| Treated Clay, Example 39 | | 65 | 1,099.8 | 30 | | 90.3 |
| Treated Clay, Example 40 | | 50 | 1,099.8 | 10 | | 93.1 |
| Treated Clay, Example 41 | | 40 | 1,099.8 | 5 | | 91.9 |
| Treated Clay, Example 42 | | 40 | 350.3 | 15 | | 92.8 |
| Treated Clay, Example 43 | | 50 | 101.0 | 30 | | 90.5 |
| Treated Clay, Example 44 | | 45 | 101.0 | 15 | | 90.6 |
| Treated Clay, Example 45 | | 25 | 101.0 | 5 | | 90.4 |

Example 46

In order to show the effect of using a fine fraction as the starting material, a sample of unbleached slurry, containing 29.9 percent clay solids, was obtained from normal plant production of a conventional coating grade fraction. This clay was previously refined from a central Georgia crude by dispersing with 4 pounds of sodium hexametaphosphate per ton of dry clay to minimum viscosity and classifying to recover a fraction composed of about 92 percent, by weight, finer than 2 microns diameter particles, E.S.D. The clay of this slurry had a brightness of 88.4. This slurry was treated by mixing in a Cowles dissolver for 30 minutes with an additional amount of dispersant, a combination of sodium hexametaphosphate, amounting to 15 pounds per ton of dry clay and sodium carbonate, amounting to 5 pounds per ton of dry clay. The treated slurry was subjected to a centrifugal force of 101 times gravity for a period of 10 minutes.

After centrifugation, the clay suspension was withdrawn from the off colored deposit and washed substantially free of excess chemicals by the method described in Example 34.

After bleaching, this specially treated clay had a brightness of 89.9, or 1.9 points higher than the control.

The starting clay of this example when conventionally bleached gave a brightness of 88.0.

Example 47

As a control for the next two examples also showing the effect of using a fine fraction as the starting material, the same starting crude used in Example 38 was slurried at about 35 percent clay solids and dispersed with 5 pounds of sodium hexametaphosphate per ton of dry clay. A conventional coating grade fraction, containing 33.4 percent clay solids, was separated from the dispersed crude. The clay of this slurry had a brightness of 83.9. Conventional bleaching with 10 pounds of zinc hydrosulfite per ton of dry clay and 6 pounds of alum per ton of dry clay gave a brightness of 87.8.

Example 48

The conventional fine fraction produced in Example 47, containing 33.4 percent solids was treated by mixing in a Cowles dissolver for 30 minutes with an additional amount of dispersant, a combination of sodium hexametaphosphate, amounting to one pound per ton of dry clay, and sodium meta-silicate, amounting to 20 pounds per ton of dry clay. A portion of this treated slurry was subjected to a centrifugal force of 575.7 times gravity for a period of 10 minutes.

After centrifugation, the clay suspension was withdrawn from the discolored deposit and washed substantially free of excess chemicals by the method described in Example 34.

After bleaching, this specially refined clay had a brightness of 91.7, or 3.9 points higher than the control.

Example 49

Example 48 was repeated except the treated slurry was subjected to a centrifugal force of 101 times gravity for a period of 10 minutes. After bleaching, this specially refined clay had a brightness of 9.0, or 2.2 points higher than the control.

TABLE XI.—EFFECT OF TREATING AND CENTRIFUGING FINE FRACTIONS

| Type Clay | Slurry Solids, Percent | Centrifugation | | Finished Clay Brightness | |
|---|---|---|---|---|---|
| | | Force Times Gravity | Time Minutes | Unbleached | Bleached |
| Fine fraction derived from Central Georgia Crude, Control | 29.9 | | | 84.4 | 88.0 |
| Treated Clay, Example 46 | | 101 | 10 | | 89.9 |
| Fine fraction derived from East Georgia Crude, Control, Example 47 | 33.4 | | | 83.9 | 87.8 |
| Treated Clay, Example 48 | | 575.7 | 10 | | 91.7 |
| Treated Clay, Example 49 | | 101 | 10 | | 90.0 |

The brightness in all of the above examples was determined by a standard T.A.P.P.I. procedure, T 646 m–54.

While the present invention has been described with reference to certain embodiments thereof, it is obvious that there may be variations which fall within the true spirit of the invention.

We claim:
1. A method of beneficiating kaolin clay comprising the steps of:
   (1) treating an aqueous clay suspension with a peptizing agent in excess of the amount required to obtain minimum viscosity and in an amount sufficient to substantially reduce the amount of titanium impurities and substantially improve the brightness of the kaolin clay,
   (2) effecting separation of said impurities from said clay suspension.
2. The method of claim 1 in which the amount of peptizing agent used is at least 100 percent in excess of the amount of said agent required to obtain minimum viscosity.
3. The method of claim 1 in which said agent is sodium hexametaphosphate.
4. The method of claim 1 in which said agent is sodium silicate.
5. A method according to claim 1 wherein the clay is refined kaolin clay, having at least 90 percent of the particles finer than 2 microns equivalent spherical diameter.
6. A method according to claim 1 wherein said clay contains less than 90 percent of the particles finer than 2 microns equivalent spherical diameter, and upon so treating the suspension said titanium impurities settle out along with coarse clay particles.
7. A method according to claim 1 wherein said suspension varies in solids concentration from about 10 percent up to about 65 percent.
8. The method according to claim 1 in which the peptizing agent is a member selected from the group consisting of polyphosphates, carbonates, silicates, alkalies, basic salts and mixtures thereof.
9. The method as claimed in claim 1 wherein said separation is effected by normal gravity settling.
10. The method as claimed in claim 1 wherein said separation is carried out by the application of multiple gravity effects.

(References on following page)

References Cited

UNITED STATES PATENTS

| | | | |
|---|---|---|---|
| 2,524,816 | 10/1950 | Lyons | 23—110 X |
| 2,251,256 | 7/1941 | Feldenheimer | 23—110 X |
| 2,758,010 | 8/1956 | Rowland | 23—110 |
| 2,981,630 | 4/1961 | Rowland | 23—110 X |
| 3,171,718 | 3/1965 | Gunn et al. | 23—110 |

OSCAR R. VERTIZ, *Primary Examiner.*

A. J. GREIF, *Assistant Examiner.*